Feb. 11, 1930. P. SCHÜNEMANN 1,746,365
ELECTROMAGNETIC FRICTION COUPLING
Filed Oct. 15, 1926

Inventor:
P. Schünemann
By: Marks & Clerk
Attys.

Patented Feb. 11, 1930

1,746,365

UNITED STATES PATENT OFFICE

PAUL SCHÜNEMANN, OF EISENACH, GERMANY, ASSIGNOR TO THE FIRM MAGNET-WERK G. M. B. H. EISENACH SPEZIALFABRIK FÜR ELEKTROMAGNET-APPARATE, OF EISENACH, GERMANY

ELECTROMAGNETIC FRICTION COUPLING

Application filed October 15, 1926, Serial No. 141,822, and in Germany October 15, 1925.

This invention relates to electromagnetically operated friction couplings, more particularly to those in which the members bringing about the frictional engagement which becomes effective when coupling form a plurality of discs or flat rings, one group of which is in operative connection with the coupling part belonging to one of the shafts and the other group with that belonging to the other shaft.

The improvements forming the subject of the present invention are more particularly applicable to those couplings of the kind referred to, working at high speeds of revolution. The object of the invention is to provide a coupling of this kind, which is capable of working under the conditions produced by the high speeds of revolution and which is reliable in its action, and cheap to make.

As regards the above and other objects to be discussed hereinafter, the invention consists in the arrangements, devices and combination of parts, described with reference to the accompanying drawing and in the claims.

Figure 1:
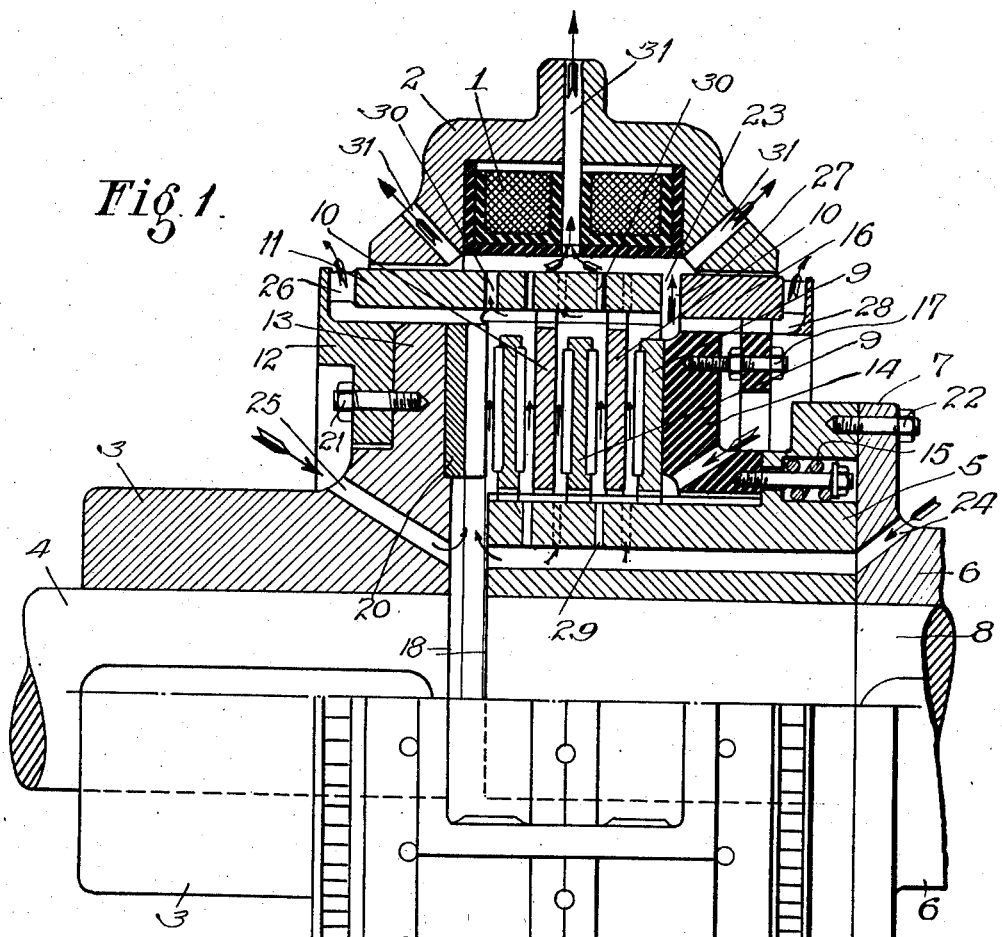

In the accompanying drawing an embodiment of the invention is shown, Fig. 1 representing a preferred constructional form of the coupling, the upper part in vertical axial section and the lower part in elevation.

Figure 2:
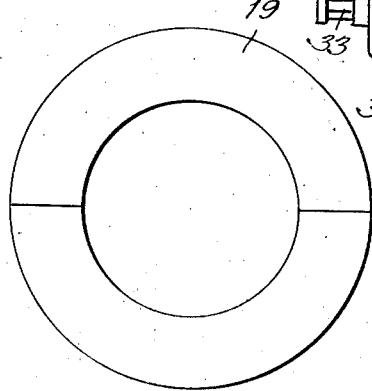

Fig. 2 is a detail view of the ring.

In all cases it is essential that the diameter of the friction members or discs of the coupling shall be as small as possible so that the peripheral velocity of the interengaging frictional parts shall be as low as possible. For this purpose the system of discs is located in the immediate vicinity of one of the shafts to be coupled, while the magnet system which is stationary in a known manner is constructed in the form of an annular body surrounding the system of discs, the lines of force of the magnetic system also completing their circuit outside the system of discs.

In the drawing a preferred constructional form of my invention is represented in vertical section through the axis and in side elevation respectively.

The energizing coil 1 of the magnet system is housed in a stationary casing 2 forming an annular hollow body divided in a plane lying at right angles to the axis of the coupling. The hub member 3 of one part of the coupling, which may be regarded as the driving part, is mounted on its shaft 4 in the usual manner, so that its inner face is flush with the end of the shaft. The hub member 5 of the other, the driven part is releasably connected to a separate part 6 provided with the flange 7, the joint between the two parts lying back from the end of the shaft 8 or in other words the shaft 8 does not extend into the bore in the hub member 5.

Of the friction rings 9, 10 one group 10 is guided in the usual manner on a hollow cylindrical body 11 surrounding the friction disc system in the form of a bell by means of teeth provided on the peripheries of the said discs, the arrangement being such that the friction discs can slide axially with respect to the bell-shaped body 11 but cannot turn. The body 11, through the cylindrical part of which the lines of force of the magnet system are closed, is provided on its outwardly facing side with an inwardly projecting flange 12, by means of which it is connected releasably with a corresponding flange 13 on the hub 3 so that it can be drawn off in the axial direction after the connecting screws have been released.

The friction discs 9 of the other group, which are provided in a known manner with linings of a material having particularly good friction properties, are mounted on the hub member 5 of the other, the driven coupling part so as to be capable of sliding axially but not of turning, by means of teeth provided on their inner peripheral surface. Similarly a strong pressure ring 14 of non-magnetizable material is mounted on the hub member 5 which ring is acted on by a number of springs 15 distributed around the periphery, which tend to draw it away from the system of friction discs. To the pressure member 14 an annular pole piece 16 which acts as the magnetic complement to the part 11 is connected by screws 17 in such a manner that it can be slid outwardly in the axial direction relatively to the pressure ring 14 and adjusted thereto.

Between the faces of the hub members 3 and 5 is a gap 18, the width of which is slightly greater than that of the thickest friction members of the friction system. The abutment for the friction disc system on the driving side of the coupling is formed by two rings 19 and 20 the latter of which is slightly let in to the flange 13 of the hub member 3 and the total width of which slightly exceeds that of the gap 18 between the two hub members. Of the two rings 19 and 20 the former is preferably divided in a radial plane.

The mode of operation of the coupling is as follows: On the energizing current being switched on, the member 14 is pressed against the system of friction discs in opposition to the pressure of the springs 15, the two shafts of the coupling being thereby coupled. On the current being switched off, the springs 15 draw the member 14 back into its initial position, the shafts being thus uncoupled. Any axial displacements between the two shafts to be coupled have no appreciable influence on the strength of the pressure, with which the parts are pressed together, as such displacements do not alter the size of the air gap of the magnet system.

The friction discs, of which those marked 10 in the drawing more particularly require replacement after wear, become readily accessible after the casing 2 has been slid aside, by the bell-shaped body 11 being drawn to the left after the screws 21 connecting it to the hub member 3 have been unscrewed. The divided ring 19 can then first be removed, after which the discs 9 and 10 can be withdrawn separately to the left from the hub member 5 and removed through the gap 18.

If the energizing coil 1 is to be replaced, the screws 22 connecting the hub member 5 with the flange 7 are released, one of the parts of the coupling carried by the hub member 5 can be withdrawn radially, and after the two halves of the magnet casing 2 have been taken apart the winding 1 can be removed.

Should the gap 23 between the pole members 11 and 16 have become reduced in course of time, owing to the wear of the friction discs, it may be brought back to the correct dimension again by the member 16 being moved to the right relatively to the pressure ring 14 by means of the screws 17. The part 16 may be secured in its new position by means of the connecting screws 17 being constructed so as to act as adjusting screws.

It is essential that the hollow spaces within the coupling, more particularly the spaces between the friction discs, may be swept through by currents of air, partly for effectively cooling the parts more particularly subject to friction and partly for removing the dust formed by wear on the friction surfaces, which collects within the coupling, more particularly when these friction surfaces consist, as is preferably the case at least partially of a woven material impregnated with a binding medium, which later on becomes hard.

The flushing of the system of friction discs with air is effected by means of a system of passages, which consists substantially of inlet passages 24, 25 which enter the interior of the coupling as near as possible to the axis, the outlet escape passages 26, 27, 28 having their outlets as near as possible to the periphery of the rotating coupling parts and the passages 29 connecting the first named passages with the spaces occupied by the discs, and the passages 30 connecting this space directly or indirectly to the outer air. In addition to this the magnet body 2 may also be provided with several series of air escape passages 31, the middle passages of the series preferably extending through the energizing coil which in that case should be made in two parts. The outlet openings of the passages 26 and 28 leading from the rotating parts of the coupling to the open air may, as indicated at 33 and 34 be formed by a series of blades distributed around the periphery in the manner of a radiator ring.

The circulation of air through the system of passages in the coupling takes place automatically owing to centrifugal force. The air continues to circulate even when one half of the coupling is stationary, in case the coupling should be disengaged. In this case the other half of the coupling produces the requisite circulation of air. The air drawn in by suction through the passages in the vicinity of the shafts, flows partly through the intermediate passages 29 and partly through the space between the faces of the two hub members into the space occupied by the discs 9, 10, sweeping through the latter along the paths indicated by arrows. The air leaves partly directly through the passages 26 and 28 and partly through the intermediate passages 30 into the air space between the stationary magnet casing 2 and the rotary parts of the coupling and thence through the passages 31 into the open air.

In this way the currents of air carry along with them all the dust deposited in the system of discs and thus remove a serious source of danger to the reliable operation of high speed friction couplings. The flow of air also provides an efficient cooling, more particularly of the friction members which are more particularly exposed to the danger of excessive heating.

The main advantages of the coupling according to my invention are as follows. In the first place the most sensitive part of the coupling, namely the magnet winding as it does not take part in the rotary motion, is not exposed to any mechanical stresses due to centrifugal force. The cooling of the winding is particularly effective, owing to the current of air caused by the rotating parts of the coupling which sweeps past it. The transmisison of power takes place directly from the coupling part 3 mounted on the shaft 4 to the part 5 of the other shaft, without any other intermediate parts besides the friction discs. A further advantage of the arrangement of the part 14 is that, owing to the fact that it can be made of brass or bronze, it has a particularly good heat conductivity, so that the heat developed in the disc system when the current is switched on is more easily dissipiated to the outside. In contradistinction to all known kinds of magnetic disc couplings, the armature body 14 which transmits the axial pressure does not take part in the transmission of the torque, so that no jamming and wear of the guiding surfaces can take place.

What I claim is:

1. In an electromagnetic coupling a stationary magnet system comprising an energizing winding and a hollow annular body enclosing said winding, two coupling members capable of displacement relative to one another, two groups of friction members between said coupling members, a rotatable hollow cylindrical body enclosing said groups of friction members and carrying one of said groups, and a rotatable magnetizable annular member capable of exerting a pressure on the friction members.

2. In an electromagnetic coupling a stationary magnet system comprising an energizing winding and a hollow annular body enclosing said winding, two coupling members capable of displacement relative to one another, two groups of friction members between said coupling members, a rotatable hollow cylindrical body enclosing said groups of friction members and carrying one of said groups, a rotatable magnetizable annular member capable of exerting a pressure on the friction members, and a separate pressure member of non-magnetic material capable of being pressed by said rotatable annular member against the friction members.

3. An electromagnetic friction coupling comprising a stationary magnet system, two coupling members capable of sliding relatively to one another, two groups of friction members located between the said coupling members and capable of being pressed together by the latter, internal means for supporting and guiding the friction members of one group and a hollow cylindrical body between said stationary magnet system and said internal means for supporting and guiding the friction members of the other group, said hollow cylindrical body being connected releasably to one of the said coupling members and capable of sliding axially with respect to the same.

4. An electromagnetic friction coupling, comprising two hub members, a hollow cylindrical body releasably connected to one of said hub members and capable of sliding axially with respect to the same after having been disconnected, two groups of friction members, one of said groups carried by the one, the other one of said groups carried by the other one of said hub members, a stationary magnet system surrounding said hollow cylindrical body and said friction members, and a pressure ring between one of said hub members and said friction members, the free distance between the adjacent ends of said hub members being greater than the width of the thickest of said friction members.

5. An electromagnetic friction coupling, comprising two hub members, a hollow cylindrical body releasably connected to one of said hub members and capable of sliding axially with respect to the same after having been disconnected, two groups of friction members, one of said groups caired by the one, the other one of said groups carried by the other one of said hub members, a stationary magnet system surrounding said hollow cylindrical body and said friction members, and two rings between one of said hub members and said friction members, one of said rings being divided in a radial plane, the free distance between the adjacent ends of said hub members being greater than the width of the thickest of said friction members.

6. In an electromagnetic coupling, a stationary magnet system comprising a winding and a hollow annular body enclosing said winding from three sides, two groups of friction discs, two separate pole rings being axially shiftable relatively one to another and forming together with said annular body the magnetic circuit of said magnet system, a pressure ring adapted to be axially displaced relatively to said friction discs, and means for connecting one of said pole rings to said pressure ring in an adjustable manner.

In testimony whereof I have signed my name to this specification.

PAUL SCHÜNEMANN.